(12) United States Patent
Kuiper et al.

(10) Patent No.: US 7,446,945 B2
(45) Date of Patent: Nov. 4, 2008

(54) ELECTROWETTING DEVICE

(75) Inventors: Stein Kuiper, Eindhoven (NL);
Bernardus Hendrikus Wilhelmus Hendriks, Eindhoven (NL); Jozef Elisabeth Aubert, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 154 days.

(21) Appl. No.: 10/596,834

(22) PCT Filed: Jan. 7, 2005

(86) PCT No.: PCT/IB2005/050095

§ 371 (c)(1),
(2), (4) Date: Jun. 27, 2006

(87) PCT Pub. No.: WO2005/069043

PCT Pub. Date: Jul. 28, 2005

(65) Prior Publication Data

US 2007/0146893 A1   Jun. 28, 2007

(30) Foreign Application Priority Data

Jan. 12, 2004   (EP) .................................. 04100077

(51) Int. Cl.
*G02B 1/06* (2006.01)
(52) U.S. Cl. ...................... 359/666; 359/665
(58) Field of Classification Search ................. 359/665, 359/666
See application file for complete search history.

(56) References Cited

U.S. PATENT DOCUMENTS

2001/0017985 A1   8/2001   Tsuboi et al.
2002/0176148 A1   11/2002  Onuki et al.
2005/0179642 A1*  8/2005   Wilcox et al. ............... 345/107

FOREIGN PATENT DOCUMENTS

WO   03/069380 A1   8/2003

* cited by examiner

*Primary Examiner*—William C Choi

(57) ABSTRACT

An electrowetting device comprises a variable element (28) and a control system (11) for the variable element (28), wherein the control system (11) is adapted to provide an asymmetric voltage waveform to the variable.

18 Claims, 4 Drawing Sheets

ELECTROWETTING DEVICE

This invention relates to an electrowetting device, a control system for an electrowetting device and to a method of controlling an electrowetting device.

Electrowetting devices typically consist of a first electrode on one side of an insulating layer and an electrically conducting fluid having a meniscus in contact with a second electrode on an opposite side of the insulating layer, wherein the application of a voltage to the electrodes causes the conducting fluid to change shape by a change in contact angle of the meniscus with the insulator. The change of shape may for instance be used to vary the focus of a light beam passing through the fluid.

Electrowetting devices are more fully described in the applicant's co-pending application WO 03/069380, a section of the description which is incorporated herein at Annex 1.

In electrowetting devices, for instance variable focus lenses, the performance is often limited by charging of the insulating layer between the first electrode and the conducting liquid. The charging of this layer may occur above a certain threshold voltage, and increases at increasing voltage and at increasing duration of application of the voltage. Charging of the insulator limits the performance of the lens and in the often occurring case of non-uniform charging the optical quality of the lens will deteriorate. Furthermore, charging may shorten the lifetime of the insulating layer.

Electrowetting can be performed using direct current (DC) as well as alternating current (AC). The advantage of AC operation is that the continuous reversal of the polarity gives charging less time to occur. Moreover, reversing the polarity may remove charge that has been built up in the insulating layer. In order to be able to use an AC-voltage, its frequency should be sufficiently higher than the mechanical resonance frequency of a meniscus of the conducting liquid. Only then will the meniscus stay in rest.

DC as well as AC operation are presently being used for electrowetting.

A first problem with electrowetting devices is that although AC operation may diminish charging of the insulating layer because of the continuously changing polarity, sinusoidal AC operation gives higher peak voltages due to the effective voltage that is required to drive the lens. An effective voltage is generally defined as the square root of the time averaged square of the voltage, also called the RMS voltage. Since the cosine of the contact angle of the meniscus in an electrowetting device is in theory proportional to the square of the voltage applied to the electrodes, the RMS value of the applied voltage is an appropriate parameter for describing the operation of an electrowetting device. An effective voltage of a sinusoidal AC supply is less than the peak voltage, so even though the effective voltage may not be particularly high, the resulting peak voltage may cause problems. As a result high peak voltages may increase charging of the insulating layer or even cause electrical breakdown of the insulator.

US 2001/0017985 discloses the application of a square-wave voltage supply to an electrowetting device.

It is an object of the present invention to mitigate the above mentioned disadvantages.

It is a further object of the invention to provide an electrowetting device with reduced charging of the insulating layer.

According to a first aspect of the present invention, an electrowetting device comprises a variable element and a control system for the variable element, wherein the control system is adapted to provide an asymmetric voltage waveform to the variable element.

Preferably the voltage waveform has a peak voltage to effective voltage ratio of less than $2^{1/2}$.

The voltage waveform supplied is preferably substantially rectilinear. Rectilinear preferably indicates a substantially square and/or rectangular waveform.

The control system may be adapted to provide a variable pulse width and/or wave height, which pulse width or wave height may vary between positive and negative sections of the waveform.

The variable element is preferably a variable focus lens.

A second problem that has been appreciated by the inventor is that the insulating layer may charge at a much faster rate at for example a positive voltage than at a negative voltage. This usually depends on the kind of insulating layer and on the kind of liquids. Also, for a certain polarity (e.g. a positive voltage) it may be harder to remove charge that has been built-up on the surface of or inside the insulator than for the opposite polarity (e.g. a negative voltage).

The advantageous use of an asymmetric waveform makes use of the surprising effect identified above.

Advantageously a substantially rectilinear voltage waveform has an effective voltage substantially equal to its peak voltage. Such a feature is advantageous compared to a sine wave, which has a peak voltage $2^{1/2}$ times greater than its effective voltage. The rectilinear voltage waveform results in less charging of an insulating layer of the variable lens.

The control system is preferably adapted to provide an asymmetric voltage waveform, in which positive and negative sections of the voltage waveform have different heights. The control system may be adapted to provide positive and negative sections of the waveform having different pulse widths.

The advantageous provision of asymmetric wave height and/or asymmetric pulse width allows the electrowetting device to compensate for the situation in which the insulating layer charges to a greater extent or more quickly when the voltage is of a given polarity.

Preferably, the voltage waveform has a frequency much greater than a mechanical resonance frequency of a meniscus of a conducting liquid of the variable element, but small enough to give the capacitor formed over the insulator ample time to charge.

Preferably, the voltage waveform has a frequency less than the frequency above which a capacitor formed by the device is not substantially charged. Substantially charged means at least half charged, but preferably at least 90% charged. Preferably, the voltage waveform has a frequency less than or equal to the frequency below which a capacitor formed by the device is substantially fully charged.

According to a second aspect of the invention a control system for an electrowetting device is adapted to provide an asymmetric voltage waveform to a variable element of the electrowetting device.

According to a third aspect of the invention, a method of controlling an electrowetting device comprises supplying an asymmetric voltage waveform to a variable element of the electrowetting device.

Preferably, said waveform has a peak voltage to effective voltage ratio less than $2^{1/2}$.

The voltage waveform may be a substantially rectilinear waveform.

The voltage waveform may have variable pulse width and/or height.

The method preferably involves supplying an asymmetric voltage waveform, preferably having asymmetric pulse width and/or pulse height for positive and negative sections of the voltage waveform.

The method preferably includes varying the pulse width and/or pulse height to reduce a charging of an insulating layer of the variable element. The variation is performed based on particular characteristics of a given variable element. Preferably, the method includes determining a particular waveform having beneficially reduced charging of the insulating layer and providing that waveform to the variable focus lens.

The invention extends to a variable lens, variable filter and/or variable diaphragm incorporating an electrowetting device according to the first aspect. The invention extends to an image capture device incorporating an electrowetting device according to the first aspect. The invention extends to a telephone incorporating an image capture device incorporating an electrowetting device according to the first aspect.

All of the features described herein may be combined with any of the above aspects, in any combination.

For a better understanding of the invention, and to show how embodiments of the same may be carried into effect, reference will now be made, by way of example, to the accompanying diagrammatic drawings in which.

The electrowetting device discussed herein forms a variable focus lens and consists of a first electrode and an electrically conducting fluid in contact with a second electrode, with an insulating layer between the first electrode and the conducting fluid. A voltage signal is applied to the electrodes to deform the conducting fluid and alter a lens focus characteristic thereof. More generally an electrowetting device contains a variable element, which in this case is a variable focus lens.

In a normal sine wave voltage the ratio of peak to effective voltage is $2^{1/2}$. Every waveform with a lower ratio will give lower peak values for a certain position of the meniscus of the conducting fluid and will therefore reduce the risk of charging or electrical breakdown in the insulating layer. In order to solve the first problem identified above we should therefore apply a waveform with a ratio below $2^{1/2}$. The best waveform has a ratio of 1 and this is obtained for a rectilinear or square wave.

Figure 6:
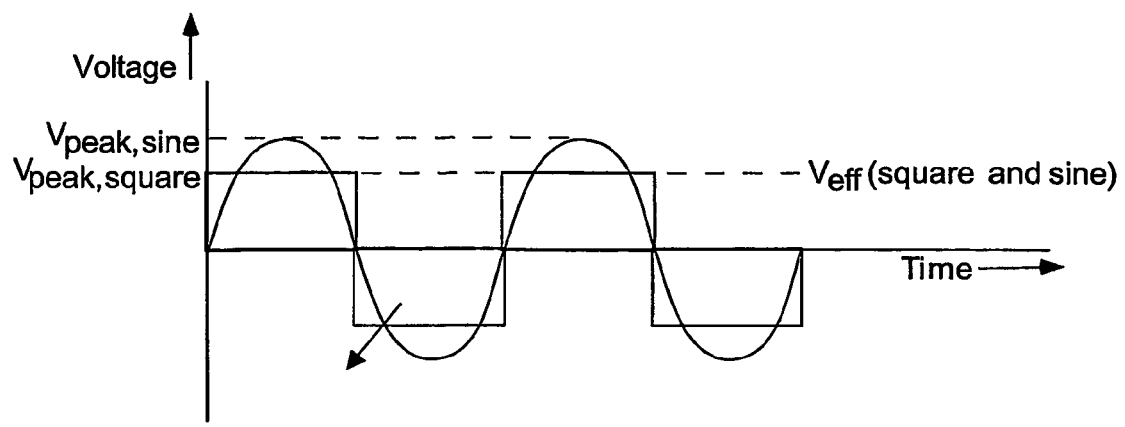
FIG. 6 is a schematic graph showing peak and effective voltages for sine and square waves.

FIG. 6 gives an illustration of the difference between a sine wave and a square wave with equal effective voltages.

The second problem identified above may be solved by making the voltage waveform asymmetric, in pulse width and/or in height. If for instance the insulator charges quickly at positive voltages, but less quickly at negative voltages, it may be useful to apply an alternating voltage for which the positive pulse is shorter and/or is lower in height than the negative pulse.

Figure 7:
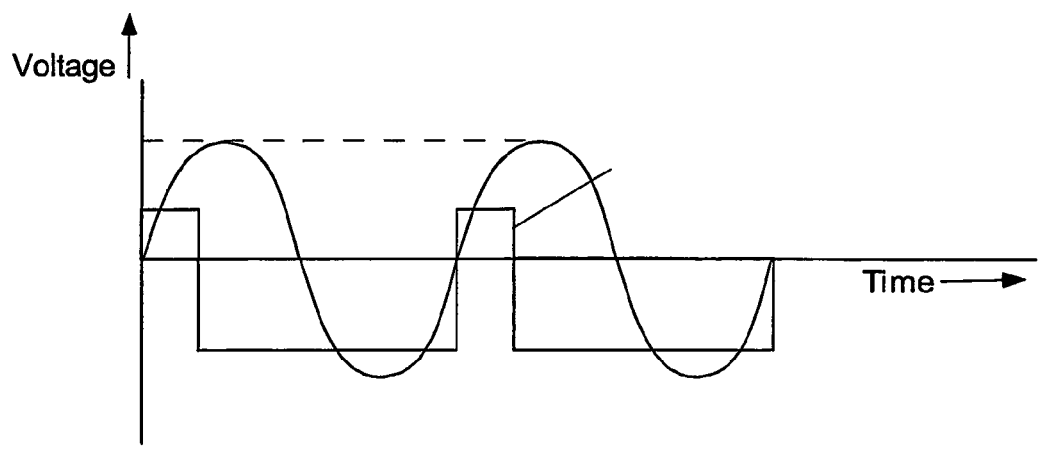
FIG. 7 is a schematic graph showing peak and effective voltages for a sine wave and an asymmetric square wave.

FIG. 7 gives an example of such an asymmetric voltage. The effective voltages of the two waves (rectangular and sine) are equal again.

Figure 8:
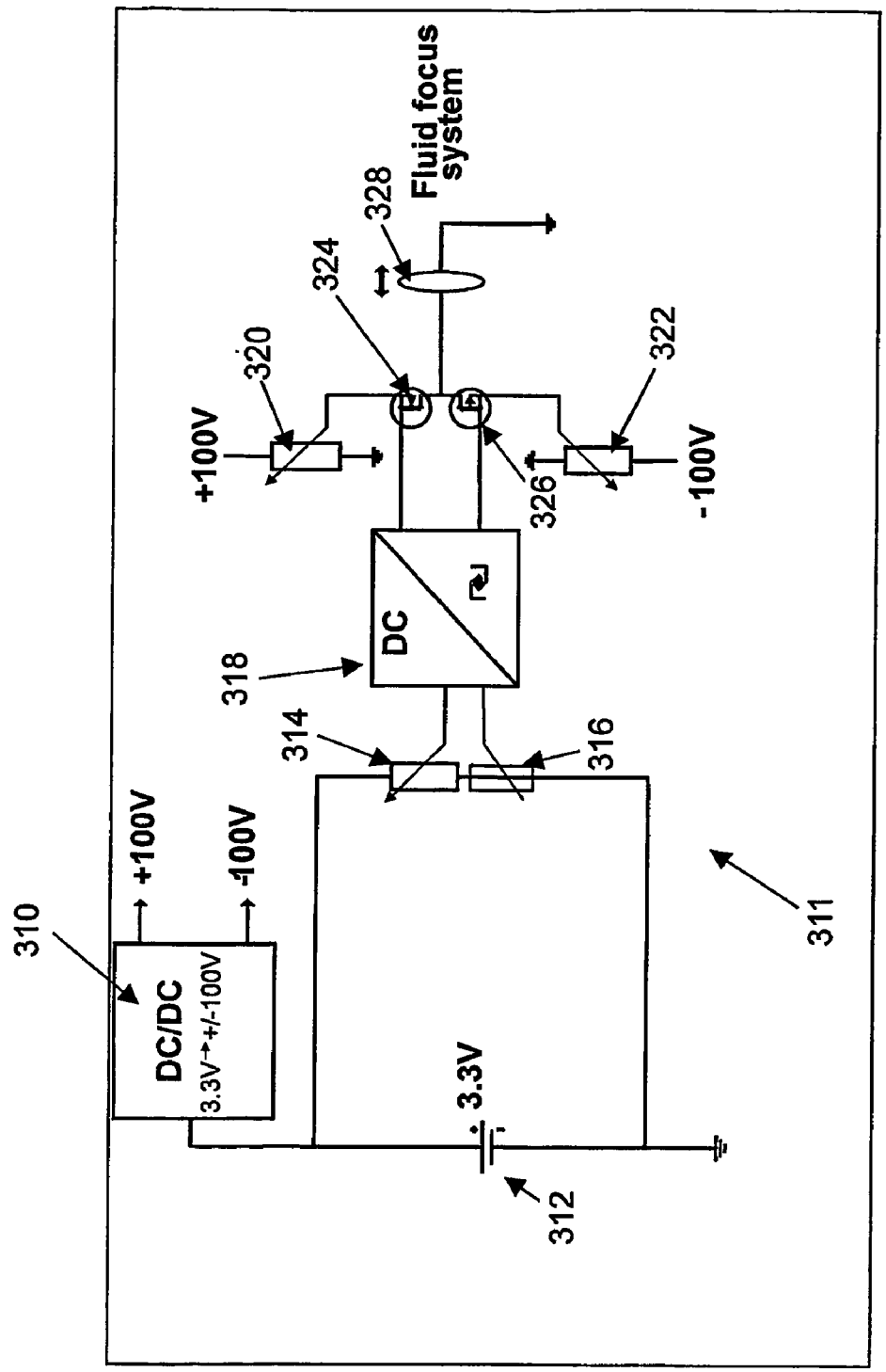
FIG. 8 is a schematic diagram of an electrowetting device control system according to the invention.

FIG. 8 shows a possible block diagram of a control system 311 operable to provide the square wave shown in FIG. 7. A DC/DC converter 310 provides a high-voltage supply to control transistors 324 and 326, providing the control voltage to a variable element, in this embodiment indicated as a fluid focus system 328. A voltage source 312 provides a DC supply of 3.3V to variable resistors 314 and 316, being a positive pulse width adjustment section 314 and a negative pulse width adjustment section 316. Both resistors are connected to a pulse width modulator (PWM) 318. Variable resistors 320 and 322 provide positive voltage level adjustment and negative voltage level adjustment respectively via transistors 324 and 326 respectively, forming a voltage switch, which is connected to the fluid focus system 328.

The width of positive and negative pulses, as achieved for FIG. 8, are determined by the variable resistors 314 and 316, with respective levels being set by the variable resistors 320 and 322. Thus a square wave having variable pulse width and height is provided to the lens 328 and fluid focus system.

The apparatus and method described above may be implemented in electrowetting devices incorporating variable elements, especially variable lenses, diaphragms, filters and pumps.

The applications include not only variable-focus lenses but also variable diaphragms, variable filters, cells for displays, electrowetting pumps, electrowetting motors, etc.

Annex 1

The following is a section of the description of WO 03/069380. The references to FIGS. 1 to 5 are references to the Figures at the end of this specification.

Figure 1:
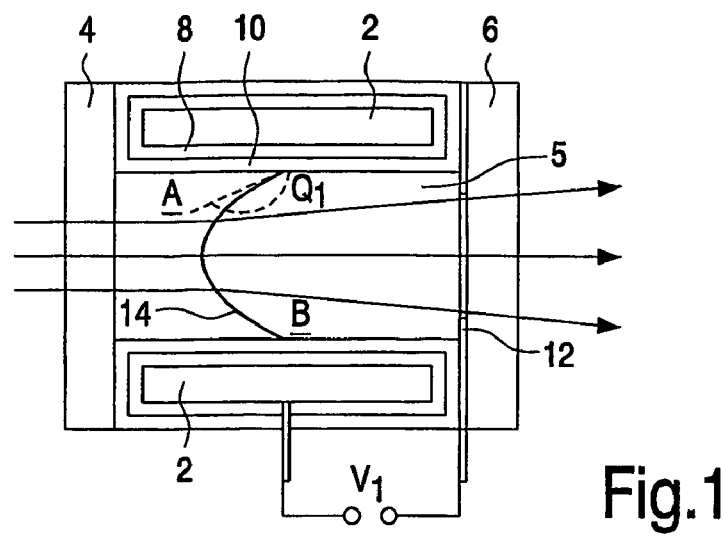
FIGS. 1 to 3 show an adjustable lens in schematic cross section from a prior publication included for background.
Figure 2:
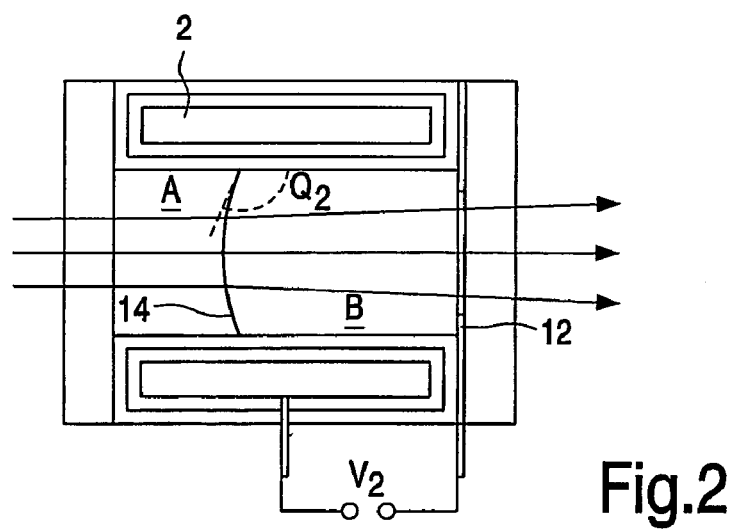
Figure 3:
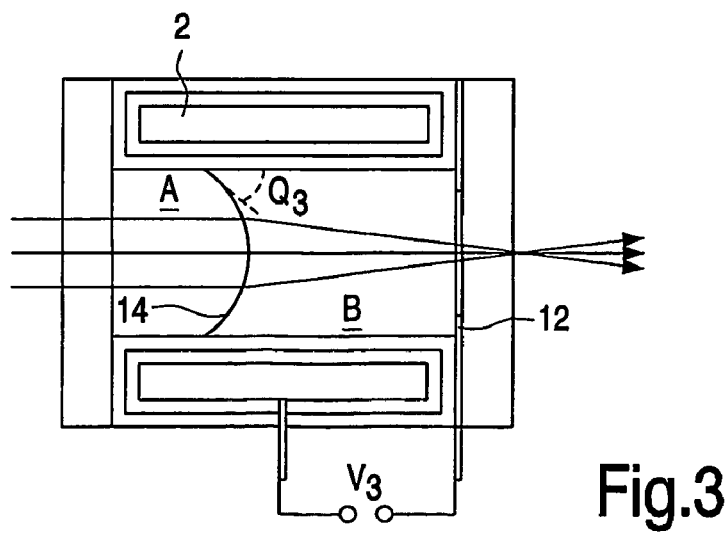
Figure 4:
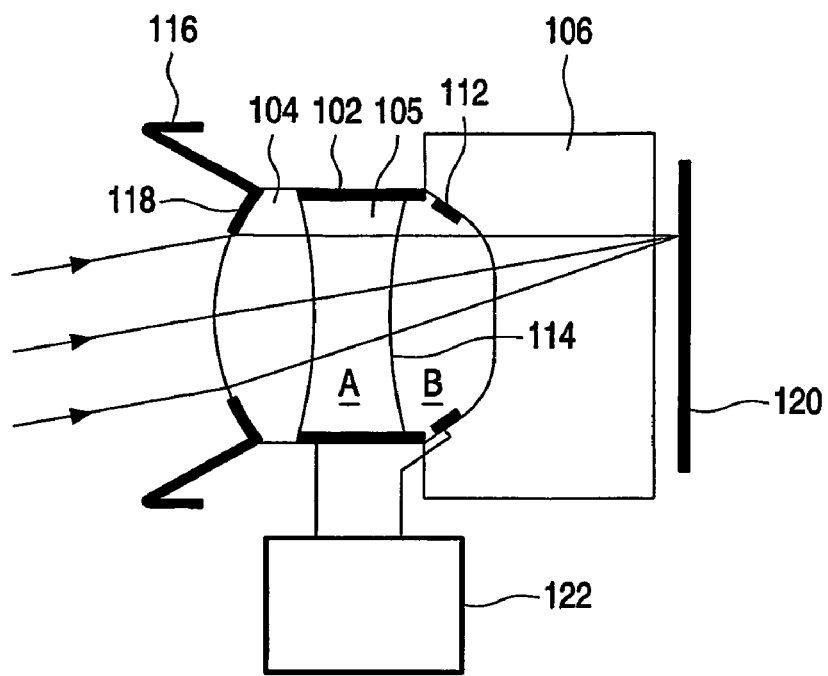
FIG. 4 shows an image capture in schematic cross section from the background material.

FIGS. 1 to 3 show an adjustable lens in schematic cross section;

FIG. 4 shows an image capture device in schematic cross section; and

Figure 5:
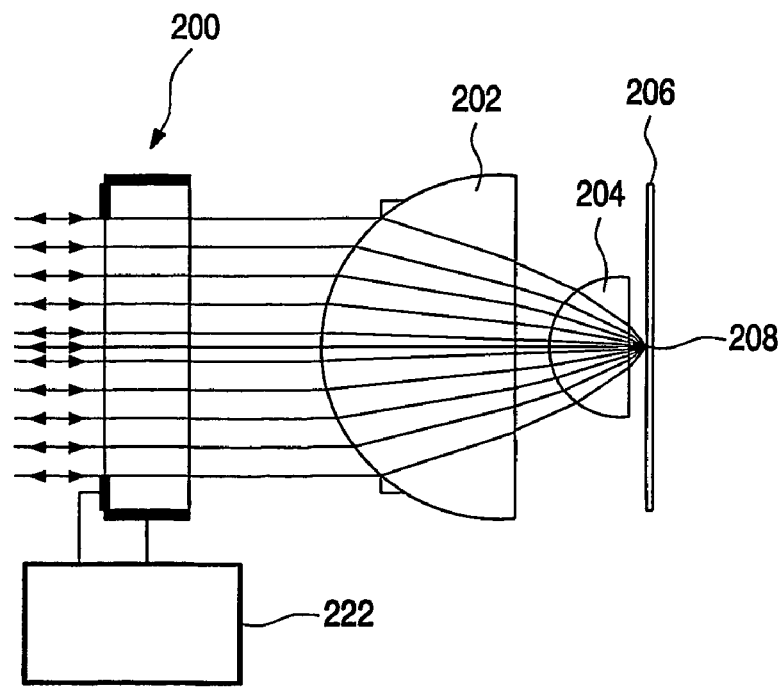
FIG. 5 shows an optical scanning in schematic cross section from the background material.

FIG. 5 shows an optical scanning device in schematic cross section.

FIGS. 1 to 3 show a variable focus lens comprising a cylindrical first electrode 2 forming a capillary tube, sealed by means of a transparent front element 4 and a transparent back element 6 to form a fluid chamber 5 containing two fluids. The electrode 2 may be a conducting coating applied on the inner wall of a tube.

In this embodiment the two fluids consist of two non-miscible liquids in the form of an electrically insulating first liquid A, such as a silicone oil or an alkane, referred to herein further as "the oil", and an electrically conducting second liquid B, such as water containing a salt solution. The two liquids are preferably arranged to have an equal density, so that the lens functions independently of orientation, i.e. without dependence on gravitational effects between the two liquids. This may be achieved by appropriate selection of the first liquid constituent; for example alkanes or silicon oils may be modified by addition of molecular constituents to increase their density to match that of the salt solution.

Depending on the choice of the oil used, the refractive index of the oil may vary between 1.25 and 1.60. Likewise, depending on the amount of salt added, the salt solution may vary in refractive index between 1.33 and 1.48. The fluids in this embodiment are selected such that the first fluid A has a higher refractive index than the second fluid B.

The first electrode 2 is a cylinder of inner radius typically between 1 mm and 20 mm. The electrode 2 is formed from a metallic material and is coated by an insulating layer 8, formed for example of parylene. The insulating layer has a thickness of between 50 nm and 100 μm, with typical values between 1 μm and 10 μm. The insulating layer is coated with a fluid contact layer 10, which reduces the hysteresis in the contact angle of the meniscus with the cylindrical wall of the fluid chamber. The fluid contact layer is preferably formed from an amorphous fluorocarbon such as Teflon™ AF1600 produced by DuPont™. The fluid contact layer 10 has a thickness of between 5 nm and 50 μm. The AF1600 coating may be produced by successive dip coating of the electrode 2, which forms a homogeneous layer of material of substantially uniform thickness since the cylindrical sides of the electrode are substantially parallel to the cylindrical electrode; dip coating is performed by dipping the electrode whilst moving the electrode in and out of the dipping solution along its axial direction. The paralyne coating may be applied using chemical vapour deposition. The wettability of the fluid contact layer by the second fluid is substantially equal on both sides of the intersection of the meniscus 14 with the fluid contact layer 10 when no voltage is applied between the first and second electrodes.

A second, annular electrode 12 is arranged at one end of the fluid chamber, in this case, adjacent the back element. The second electrode 12 is arranged with at least one part in the fluid chamber such that the electrode acts on the second fluid B.

The two fluids A and B are non-miscible so as to tend to separate into two fluid bodies separated by a meniscus 14. When no voltage is applied between the first and second electrodes, the fluid contact layer has a higher wettability with respect to the first fluid A than the second fluid B. Due to electrowetting, the wettability by the second fluid B varies under the application of a voltage between the first electrode and the second electrode, which tends to change the contact angle of the meniscus at the three phase line (the line of contact between the fluid contact layer 10 and the two liquids A and B). The shape of the meniscus is thus variable in dependence on the applied voltage.

Referring now to FIG. 1, when a low voltage $V_1$, e.g. between 0 V and 20 V, is applied between the electrodes the meniscus adopts a first concave meniscus shape. In this configuration, the initial contact angle $\theta_1$ between the meniscus and the fluid contact layer 10, measured in the fluid B, is for example approximately 140°. Due to the higher refractive index of the first fluid A than the second fluid B, the lens formed by the meniscus, here called meniscus lens, has a relatively high negative power in this configuration.

To reduce the concavity of the meniscus shape, a higher magnitude of voltage is applied between the first and second electrodes. Referring now to FIG. 2, when an intermediate voltage $V_2$, e.g. between 20 V and 150 V, depending on the thickness of the insulating layer, is applied between the electrodes the meniscus adopts a second concave meniscus shape having a radius of curvature increased in comparison with the meniscus in FIG. 1. In this configuration, the intermediate contact angle $\theta_2$ between the first fluid A and the fluid contact layer 10 is for example approximately 100°. Due to the higher refractive index of the first fluid A than the second fluid B, the meniscus lens in this configuration has a relatively low negative power To produce a convex meniscus shape, a yet higher magnitude of voltage is applied between the first and second electrodes. Referring now to FIG. 3, when a relatively high voltage $V_3$, e.g. 150 V to 200 V, is applied between the electrodes the meniscus adopts a meniscus shape in which the meniscus is convex. In this configuration, the maximum contact angle $\theta_3$ between the first fluid A and the fluid contact layer 10 is for example approximately 60°. Due to the higher refractive index of the first fluid A than the second fluid B, the meniscus lens in this configuration has a positive power.

Note that, whilst achieving the configuration of FIG. 3 is possible using a relatively high power, it is preferred in a practical embodiment that a device including the lens as described is adapted to use only low and intermediate powers in the ranges described, that is to say that the voltage applied is restricted such that the electrical field strength in the insulating layer is smaller than 20 V/μm, and excessive voltages causing charging of the fluid contact layer, and hence degradation of the fluid contact layer, are not used.

Note furthermore that the initial, low voltage, configuration will vary in dependence on the selection of the liquids A and B, in dependence on their surface tensions). By selecting an oil with a higher surface tension, and/or by adding a component, such as ethylene glycol, to the salt solution which reduces its surface tension, the initial contact angle can be decreased; in this case the lens may adopt a low optical power configuration corresponding to that shown in FIG. 2, and an intermediate power configuration corresponding to that shown in FIG. 3. In any case, the low power configuration remains such that the meniscus is concave, and a relatively wide range of lens powers can be produced without using an excessive voltage.

Although the fluid A has a higher refractive index than fluid B in the above example, the fluid A may also have a lower refractive index than fluid B. For example, the fluid A may be a (per)fluorinated oil, which has a lower refractive index than water. In this case the amorphous fluoropolymer layer is preferably not used, because it might dissolve in fluorinated oils. An alternative fluid contact layer is e.g. a paraffin coating.

FIG. 4 illustrates a variable focus image capture device including a lens in accordance with an embodiment of the present invention. Elements similar to that described in relation to FIGS. 1 to 3 are provided with the same reference numerals, incremented by 100, and the previous description of these similar elements should be taken to apply here.

The device includes a compound variable focus lens including a cylindrical first electrode 102, a rigid front lens 104 and a rigid rear lens 106. The space enclosed by the two lenses and the first electrode forms a cylindrical fluid chamber 105. The fluid chamber holds the first and second fluids A and B. The two fluids touch along a meniscus 114. The meniscus forms a meniscus lens of variable power, as previously described, depending on a voltage applied between the first electrode 102 and the second electrode 112. In an alternative embodiment, the two fluids A and B have changed position.

The front lens 104 is a convex-convex lens of highly refracting plastic, such as polycarbonate or cyclic olefin copolymer, and having a positive power. At least one of the surfaces of the front lens is aspherical, to provide desired initial focusing characteristics. The rear lens element 106 is formed of a low dispersive plastic, such as COC (cyclic olefin copolymer) and includes an aspherical lens surface which acts as a field flattener. The other surface of the rear lens element may be flat, spherical or aspherical. The second electrode 112 is an annular electrode located to the periphery of the refracting surface of the rear lens element 106.

A glare stop 116 and an aperture stop 118 are added to the front of the lens. A pixellated image sensor 120, such as a CMOS sensor array, is located in a sensor plane behind the lens.

An electronic control circuit 122 drives the meniscus lens, in accordance with a focus control signal, derived by focus control processing of the image signals, so as to provide an object range of between infinity and 10 cm. The control circuit controls the applied voltage between a low voltage level, at which focusing on infinity is achieved, and higher voltage levels, when closer objects are to be focused. When focusing on infinity, a concave meniscus with a contact angle of approximately 140° is produced, whilst when focusing on 10 cm, a concave meniscus with a contact angle of approximately 100° is produced.

The conducting second fluid, the insulating layer and the second electrode form an electrical capacitor, the capacitance of which depends on the position of the meniscus. The capacitance can be measured using a conventional capacitance meter. The optical strength of the meniscus lens can be determined from the measured value of the capacitance.

The lens is configured such that a low, non-zero, voltage is applied to focus the lens on an object at infinity (parallel incoming rays), so as to provide the capability to focus on infinity within reasonable manufacturing tolerances; if on the other hand the lens were to be configured such that focusing on infinity occurred when zero voltage is applied, more strict manufacturing tolerances would have to be applied.

The front lens element 104 is preferably formed as a single body with a tube holding the electrode 102 on its inner surface and closed off by the rear lens 106 to form a sealed unit. The second lens element 106 may be extended, in relation to that shown in FIG. 4, and the flat rear surface of the lens element 106 may be replaced by an angled mirror surface, preferably angled at 45°, to allow the image sensor 120 to be placed below the lens, in order to reduce the dimensions of the lens.

The fluid chamber 105 may be provided with an expansion chamber to accommodate volume changes due to thermal expansion of the fluids. The expansion chamber may be a flexible membrane in one of the walls of the fluid chamber.

The inner surfaces of the front lens 104 and the rear lens 106 may be coated with a protective layer to avoid incompatibility of the material from which the lenses are made with the fluids A and B. The protective layer may also have anti-reflection characteristics.

FIG. 5 shows elements from an optical scanning device containing a lens in accordance with an embodiment of the invention. The device is for recording and/or playback from an optical disk 206, for example a dual layer digital video recording (DVR) disk (see for instance the article by K. Schep, B. Stek, R. van Woudenberg, M. Blum, S. Kobayashi, T. Narahara, T. Yamagami, H. Ogawa, "Format description and evaluation of the 22.5 GB DVR disc", Technical Digest, ISOM 2000, Chitose, Japan, Sep. 5-8, 2000). The device includes a compound objective lens, for instance having a numerical aperture of 0.85, including a rigid front lens 202 and a rigid rear lens 204, for instance as described in International patent application WO 01/73775, for focusing the incoming collimated beam, for instance having a wavelength of 405 nm, consisting of substantially parallel rays, to a spot 208 in the plane of an information layer currently being scanned.

In dual layer DVR disks the two information layers are at depths of 0.1 mm and 0.08 mm; they are thus separated by typically 0.02 mm. When refocusing from one layer to the other, due to the difference in information layer depth, some 200 m$\lambda$ of unwanted spherical wavefront aberration arises, which needs to be compensated. One way to achieve this is to change the vergence of the incoming beam using a mechanical actuator, for example moving a collimator lens in the device, which is relatively expensive. Another approach is to use a switchable liquid crystal cell, which is also a relatively expensive solution.

In this embodiment, a switchable variable focus lens 200 similar to that described in relation to FIGS. 1 to 3 is used. In this embodiment, the oil chosen is polydimethyl (8-12%)-phenylmethylsiloxane copolymer, and a salt water solution is used as the conducting liquid. Each of the liquids, when the lens 200 is arranged with a planar meniscus, has a thickness of approximately 1 mm.

The device includes an electronic control circuit 222 for applying one of two selected voltages to the electrodes of the lens 200 in dependence on the information layer currently being scanned. In one configuration, during the scanning of the information layer depth of 0.08 mm, a relatively low selected voltage is applied to produce a meniscus curvature of radius R=−21.26 mm. In the other configuration, during the scanning of the information layer depth of 0.1 mm, a relatively high selected voltage is applied to produce a planar meniscus curvature. As a result, the root mean square value of the wavefront aberration can be reduced from 200 m$\lambda$, to 18 m$\lambda$. Note that a similar effect can be obtained using different combinations of meniscus curvatures, since only a variation in lens power is required; furthermore the difference in lens power can also be achieved with larger movements in the meniscus by making the refractive indices of the two liquids more similar.

Note, in relation to all the above embodiments, the electrode is itself preferably cylindrical, but some variation from a perfect cylinder is possible, e.g. slightly conical. However, the cylinder should preferably remain substantially cylindrical, namely where the fluid contact layer has a linear cross section, i.e. the layer forms straight lines in a cross section of the cylinder, where the axis of the cylinder lies in the cross section. The linear cross section should be parallel to the axis of the electrode at least to within 10 degrees, more preferably at least to within 1 degree. A cylindrical electrode can be made using conventional, cheap tubing having a cross section which is parallel to the axis within 0.1 degree and a smooth inner wall on which the various layers can be deposited. The possibility to use such tubing gives the lens according to the invention a cost advantage. The fluid contact layer may itself not be perfectly linear; however any non-linearity is preferably limited such that the non linearity causes a difference in radial extent less than one tenth, more preferably less than one twentieth, of the axial extent of the electrode.

The above embodiments are to be understood as illustrative examples of the invention. Further embodiments of the invention are envisaged. For example, the first fluid may consist of a vapour rather than an insulating liquid. The second fluid may be a fluid having a lower surface tension than the first fluid. In that case the shape of the meniscus at low applied voltages will be convex.

The invention claimed is:

1. An electrowetting device comprising a variable element and a control system for the variable element, wherein the control system is adapted to provide an asymmetric voltage waveform to the variable element.

2. An electrowetting device, as claimed in claim 1 having a peak voltage to effective voltage ratio of less than $2^{1/2}$.

3. An electrowetting device as claimed in claim 1, in which the voltage waveform supplied is substantially rectilinear.

4. An electrowetting device as claimed in claim 1, in which the control system is adapted to provide a variable pulse width and/or wave height.

5. An electrowetting device as claimed in claim 4, in which positive and negative sections of the voltage waveform have different heights.

6. An electrowetting device as claimed in claim 4, in which the control system is adapted to provide positive and negative sections of the waveform having different pulse widths.

7. An electrowetting device as claimed in claim 1, in which the variable element is a variable focus lens.

8. An electrowetting device as claimed in claim 1, in which the voltage waveform has a frequency much greater than a mechanical resonance frequency of a meniscus of a conducting liquid of the variable element.

9. An electrowetting device as claimed in claim 1, in which the voltage waveform has a frequency less than the frequency above which a capacitor formed by the device is not substantially fully charged.

10. An variable lens, variable filter and/or variable diaphragm incorporating an electrowetting device as claimed in claim 1.

11. An image capture device incorporating an electrowetting device as claimed in claim 1.

12. A telephone incorporating an image capture device incorporating an electrowetting device as claimed in claim 1.

13. A method of controlling an electrowetting device comprises supplying an asymmetric voltage waveform to a variable element of the electrowetting device.

14. A method of controlling an electrowetting device, as claimed in claim 13, in which said waveform has a peak voltage to effective voltage ratio less than $2^{1/2}$.

15. A method of controlling an electrowetting device as claimed in claim 13, in which the voltage waveform is a substantially rectilinear voltage waveform.

16. A method of controlling an electrowetting device as claimed in claim 13, in which the voltage waveform has a variable pulse width and/or height.

17. A method of controlling an electrowetting device as claimed in claim 13, which includes varying the pulse width and/or pulse height to reduce a charging of an insulating layer of the variable element.

18. A method of controlling an electrowetting device as claimed in claim 17, which includes determining a particular waveform having reduced charging of the insulating layer and providing that waveform to the variable focus lens.

* * * * *